(12) United States Patent
Wada et al.

(10) Patent No.: US 6,675,623 B2
(45) Date of Patent: Jan. 13, 2004

(54) METHOD AND APPARATUS FOR MANUFACTURING KEYSTONE TYPE SUPERCONDUCTING COMPACTED STRANDED WIRES

(75) Inventors: Katsunori Wada, Tokyo (JP); Tatsuo Shimada, Tokyo (JP)

(73) Assignee: The Furukawa Electric Co., Ltd. (JP)

( * ) Notice: Subject to any disclaimer, the term of this patent is extended or adjusted under 35 U.S.C. 154(b) by 0 days.

(21) Appl. No.: 09/937,106

(22) PCT Filed: Jul. 13, 2001

(86) PCT No.: PCT/JP01/06101

§ 371 (c)(1),
(2), (4) Date: Jul. 9, 2002

(87) PCT Pub. No.: WO03/009309

PCT Pub. Date: Jan. 30, 2003

(65) Prior Publication Data

US 2003/0024291 A1 Feb. 6, 2003

(51) Int. Cl.[7] .............................................. B21B 13/10
(52) U.S. Cl. ........................................... 72/224; 29/599
(58) Field of Search ...................... 72/224, 235, 225, 72/252.5; 29/419.1, 599, 605

(56) References Cited

U.S. PATENT DOCUMENTS

| | | | | |
|---|---|---|---|---|
| 914,332 | A | * 3/1909 | Briede | 72/209 |
| 3,279,234 | A | * 10/1966 | Ames | 72/252.5 |
| 3,320,788 | A | * 5/1967 | Meier | 72/224 |
| 3,616,669 | A | * 11/1971 | Shumaker | 72/200 |
| 4,494,396 | A | * 1/1985 | Iwanami et al. | 72/241.6 |
| 4,781,050 | A | * 11/1988 | Winter et al. | 72/205 |

FOREIGN PATENT DOCUMENTS

| | | | | |
|---|---|---|---|---|
| DE | 1938659 | A * | 7/1969 | B21B/1/18 |
| JP | 63-190213 | | 8/1988 | |
| JP | 04106811 | A * | 4/1992 | H01B/13/00 |
| JP | 5-114317 | | 5/1993 | |
| JP | 05114317 | A * | 5/1993 | H01B/13/00 |
| JP | 8-171827 | | 7/1996 | |

OTHER PUBLICATIONS

International Search Report for PCT Application No. PCT/JP01/06101, dated Oct. 12, 2001.

Hannaford, R., et al., "Resolutions to Difficulties Expereienced in SSC Cable Fabrication During the Initial Scale–Up Period", IEEE Transactions On Magnetics, vol. 27, No. 2, pp. 2024–2026, (Mar. 1991).

* cited by examiner

*Primary Examiner*—Allen Ostrager
*Assistant Examiner*—John S. Goetz
(74) *Attorney, Agent, or Firm*—Cantor Colburn LLP

(57) ABSTRACT

The present invention relates to a method and an apparatus for manufacturing keystone type superconducting compacted stranded wires. In manufacturing the keystone type superconducting compacted stranded wires, a large number of superconducting wires are stranded to form stranded wires, which are then roll-formed. The method and apparatus are configured so that, in the roll-forming, one side of the compacted stranded wires, which is thinner than the other side thereof after being roll-formed, comes into contact with one flat roll before the other side of the compacted stranded wires comes into contact with another flat roll. The method and apparatus are provided as another configuration wherein one flat roll to contact with the compacted stranded wires to be thicker is smaller in diameter than another flat roll to contact with the compacted stranded wires to be thinner. There is provided another configuration wherein one flat roll to contact with the compacted stranded wires to be thicker is located backward in roll axis position than another flat roll to contact with the compacted stranded wires to be thinner.

11 Claims, 6 Drawing Sheets

METHOD AND APPARATUS FOR MANUFACTURING KEYSTONE TYPE SUPERCONDUCTING COMPACTED STRANDED WIRES

TECHNICAL FIELD

The present invention relates to a method and an apparatus for manufacturing superconducting compacted stranded wires with keystone angles.

BACKGROUND ART

Figure 7:
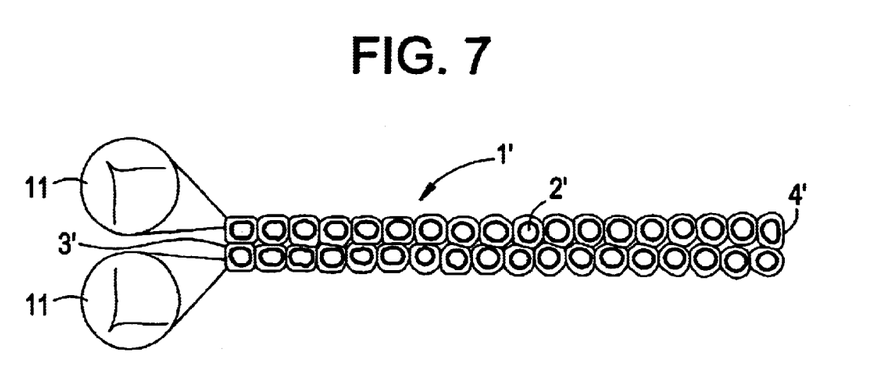
FIG. 7 shows a cross section of the keystone type superconducting compacted stranded wires according to the conventional manufacturing method.

A dipole magnet, which is disposed in an accelerator ring of a circular particle accelerator, is required to generate magnetic field of higher intensity and generate dipole magnetic field in the long distance. To satisfy these requirements, a saddle coil is frequently used as the dipole magnet for the accelerator. The saddle coil has a structure in which compacted stranded wires are placed along the axis of the coil and turned at both coil ends in sequence so as to form an arch shape as a whole, so that a cross section in the straight portion of the coil is shaped into a sector form. In order that a packing rate in a superconducting portion within the saddle coil is raised to obtain a high current density in the coil, it is desired to employ superconducting stranded wires of which cross section is shaped into a so-called keystone type. The keystone type superconducting compacted stranded wires 1', formed from stranded wires comprising superconducting wires 2', as shown in FIG. 7, is formed to have a trapezoidal-shaped cross-section which has two side ends of different heights, one side end 3' shorter than the other side end 4', as shown in FIG. 7.

Figure 5A:
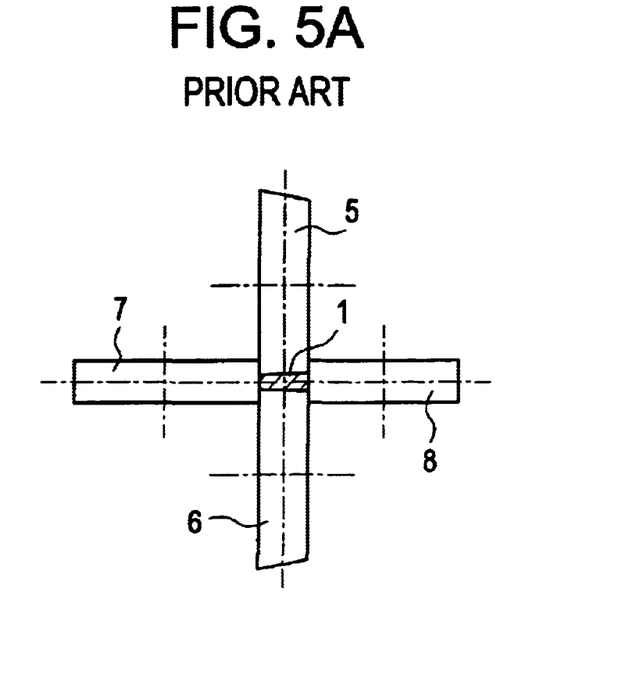
FIG. 5A is the front view of a group of rolls for for roll-forming superconducting stranded wires according to a conventional manufacturing method.
Figure 5B:
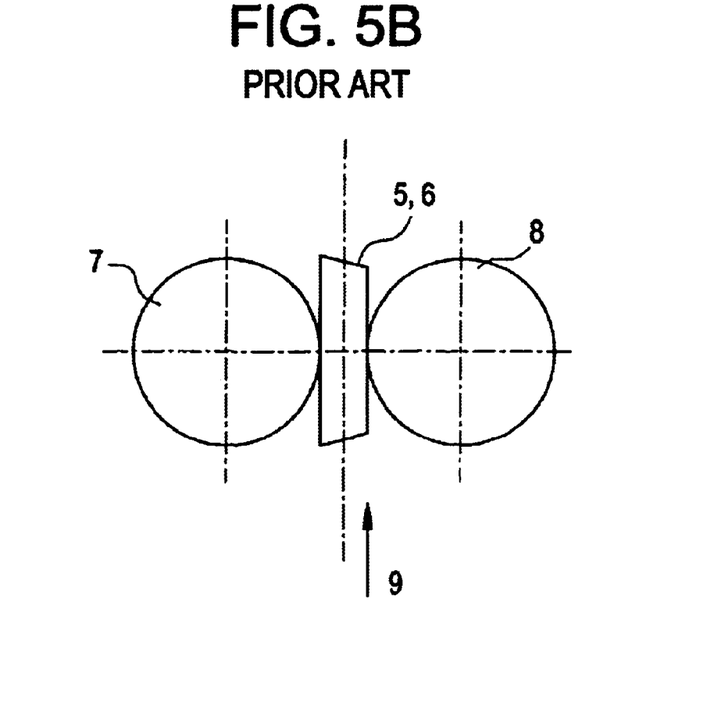
FIG. 5B is the plan view of the group of rolls for roll-forming superconducting stranded wires as shown in FIG. 5A.

Conventionally, in general, the keystone type compacted stranded wires are produced through procedures described in detail hereunder. A plurality of superconducting wires are stranded into stranded wires (hereinafter referred to as superconducting stranded wires). The superconducting wires are press-formed in four directions by four rolls, as shown in FIGS. 5A and 5B, thus producing compacted stranded wires of which cross section is trapezoidal. The four rolls are made up of, rolls 5' and 6' (hereinafter referred to as tapered rolls) and cylindrical rolls (hereinafter referred to as flat rolls) 7' and 8'. The tapered rolls 5 and 6 have rotation axes parallel with each other and are tapered on the outer surface thereof, while the flat rolls 7' and 8' have rotation axes orthogonal to those of the tapered rolls 5' and 6'.

The packing rate in the compacted stranded wires is set to be a high value so as to increase the current density in the coil. This setting causes the superconducting wires to locally receive higher compressive force and tension during being stranded. In particular, edge portions of the compacted stranded wires receive bending force, in addition to the above-mentioned compressive force and tension, so that the superconducting wires deform in such manner that the original shape thereof hardly remains.

When superconducting stranded wires are roll-formed to obtain a keystone angle, one side end portion of both side end portions of the superconducting compacted stranded wires, which is thinner than the other side end portion in the cross section, receives the most severe compressive force, Thus, breakage of superconducting filaments serving as transportation paths of current may occur. Furthermore, in roll-forming, some of the superconducting wires which have lost respective destination in a closed space enclosed between rolls and adjacent superconducting wires may extend excessively in its longitudinal direction, thus causing a locally reduced sectional area of the superconducting filaments. What is worse, the superconducting wires with no destination may cause burrs. It is therefore apt to cause some drawbacks in both of the superconducting properties and contours.

In cases the keystone type superconducting compacted stranded wires are manufactured in the industrial scale, the keystone angle is specified as being less than one degree. Burrs produced on the edge portions in one side end of the superconducting compacted stranded wires, which is thinner than the other side in the cross section, may be removed by grinding. Removing the burrs on the edge portions in such a way leads to partial removal of a normal conducting matrix disposed for stabilization. Therefore, there is a problem in which the stability in the superconducting property in the portion with the burrs removed is locally lowered. Furthermore, when the portion removed by grinding extends to superconducting filament portions, there occurs a problem in which the current to be transported is reduced in large extent.

SUMMARY OF THE INVENTION

A method of manufacturing keystone type superconducting compacted stranded wires according to the present invention is to roll-form superconducting stranded wires into keystone type superconducting compacted stranded wires by using a pair of tapered rolls of which outer surfaces are tapered and of which rotation axes are parallel with each other and a pair of flat rolls of which rotation axes are perpendicular to those of the tapered rolls and parallel with each other, one side of said superconducting stranded wires, which becomes thinner than other side of said superconducting stranded wires after being roll-formed, being contacted with one of said pair of flat rolls before said other side of said superconducting stranded wires is contacted with other of said pair of flat rolls.

An apparatus for manufacturing keystone type superconducting compacted stranded wires according to the present invention includes a group of forming rolls comprising a pair of tapered rolls of which rotation axes are parallel with each other and a pair of flat rolls of which rotation axes are parallel with each other and are orthogonal to the rotation axes of the tapered rolls, in which a diameter of one flat roll in said pair of flat rolls to contact with the one side of the superconducting stranded wires, which is thinner than the other side after being roll-formed, is larger than that of the other roll in said pair of flat rolls.

Superconducting stranded wires to be roll-formed according to the present invention includes superconducting stranded wires which are pre-formed as required.

DETAILED DESCRIPTION

With reference to the accompanying drawings, embodiments of the present invention are described in detail. The following description is directed to limited embodiments, however, does not intend to limit the scope of the present invention. The present invention will include scopes which a person skilled in the art is able to easily conceive from the following description.

One of the object of the present invention is to provide a method and an apparatus for manufacturing stable and reliable superconducting compacted stranded wires by means of improved fabrication conditions of the stranded wires.

A first embodiment of the present invention is a method of manufacturing keystone type superconducting compacted stranded wires, wherein superconducting stranded wires are roll-formed into keystone type superconducting compacted stranded wires by using a group of rolls comprising a pair of tapered rolls of which outer surfaces are tapered and of which rotation axes are parallel with each other and a pair of flat rolls of which rotation axes are perpendicular to those of the tapered rolls and parallel with each other, and one side end of said superconducting stranded wires, which becomes thinner than other side end of said superconducting stranded wires after being roll-formed, is contacted with one flat roll of said pair of flat rolls before said other side end of said superconducting stranded wires is contacted with other flat roll of said pair of flat rolls.

A second embodiment of the present invention is a method of manufacturing keystone type superconducting compacted stranded wires, wherein a diameter of said one flat roll in said pair of flat rolls to contact with said one side end of the superconducting stranded wires, which is thinner than said other side end after being roll-formed, is larger than that of said other flat roll in said pair of flat rolls, thus said one side end of the superconducting stranded wires, which is thinner than said other side end after being roll-formed, is contacted with said one flat roll prior to said other side end of the superconducting stranded wires is contacted with said other flat roll.

A third embodiment of the present invention is a method of manufacturing keystone type superconducting compacted stranded wires, wherein said other flat roll in said pair of flat rolls to contact with said other side end of the superconducting stranded wires, which is thicker than said one side end after being roll-formed, is located backward compared to said one flat roll in relation to a direction in which the superconducting stranded wires are moved, thus said one side end of the superconducting stranded wires, which is thinner than said other side end after being roll-formed, is contacted with said one flat roll prior to said other side end of the superconducting stranded wires is contacted with said other flat roll.

A first embodiment of an apparatus of the invention for manufacturing keystone type superconducting compacted stranded wires includes a group of forming rolls comprising a pair of tapered rolls of which rotation axes are parallel with each other and a pair of flat rolls of which rotation axes are parallel with each other and are orthogonal to the rotation axes of the tapered rolls, in which a diameter of one flat roll in said pair of flat rolls to contact with one side end of the superconducting stranded wires, which is thinner than other side end after being roll-formed, is larger than that of other roll in said pair of flat rolls.

Figure 1A:
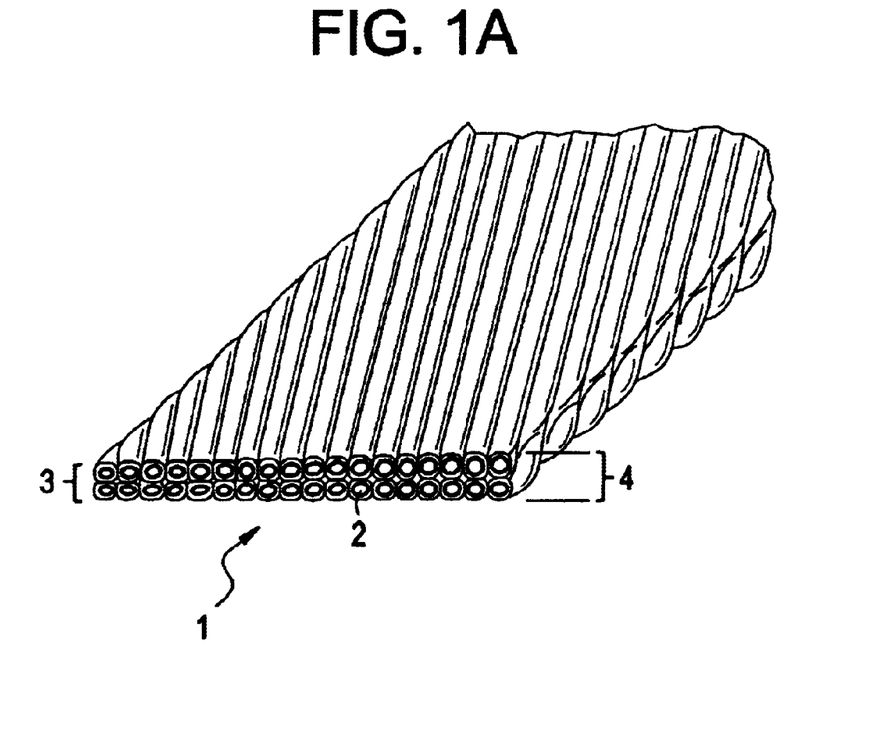
FIG. 1A is a perspective view exemplifying the cross section of keystone type superconducting compacted stranded wires manufactured by the method of the invention.
Figure 1B:
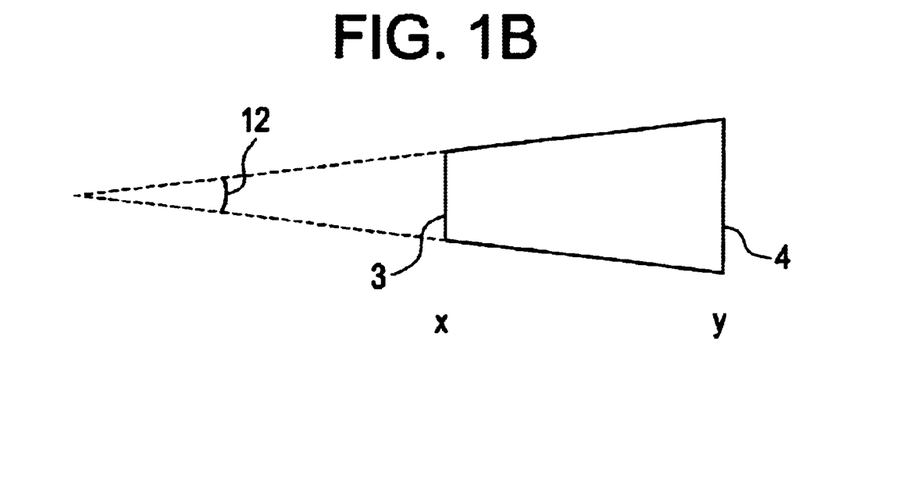
FIG. 1B is an illustration of the cross section of the keystone type superconducting compacted stranded wires as a trapezoidal shape to explain the keystone angle.

A second embodiment of an apparatus of the invention for manufacturing keystone type superconducting compacted stranded wires includes a group of forming rolls comprising a pair of tapered rolls of which rotation axes are parallel with each other and a pair of flat rolls of which rotation axes are parallel with each other and are orthogonal to the rotation axes of the tapered rolls in which a rotation axis of one flat roll in said pair of flat rolls to contact with one side end of the superconducting stranded wires, which is thicker than other side end after being roll-formed, is located backward compared to that of other flat roll in relation to a direction in which the superconducting stranded wires are moved, The keystone type superconducting compacted stranded wires of the invention, prepared from stranded wires comprising superconducting wires 2, as shown in FIG. 1A, is roll-formed so as to have a trapezoidal-shaped cross-section which has one side end 3 shorter than the other side end 4, as shown in FIG. 1B. The angle 12 shown in FIG. 1B is called a keystone angle.

Incidentally, the packing rate is defined as a value which can be obtained by dividing an area occupying the superconducting compacted stranded wires by an area of a portion enclosed by a trapezoidal circumscribed line of the keystone type superconducting compacted stranded wires, and is about 90 percents.

Keystone type superconducting compacted stranded wires 1 shown in FIG. 1A are manufactured in such a way that a plurality of superconducting wires are stranded into stranded wires and the thus prepared stranded wires are press-formed by means of rolls from four directions.

In the keystone type superconducting compacted stranded wires 1 as shown in FIG. 1A, one side end of the wires, which is smaller in thickness and designated by reference numeral 3 is hereinafter referred to as x, while the other side end of the wires, which is larger in thickness and designated by reference numeral 4 is hereinafter referred to as y. In addition, in the pair of rolls 5 and 6 which are tapered as shown in FIGS. 2A and 2B to FIGS. 4A and 4B, the roll 5 is hereinafter referred to as a tapered roll A and the other roll 6 is hereinafter referred to as a tapered roll B. Furthermore, in the pair of flat rolls 7 and 8 used for pressing the sides x and y of the superconducting stranded wires, the roll 7 coming in contact with the side x is hereinafter referred to as a flat roll X, whilst the other roll 8 coming in contact with the side y is hereinafter referred to as a flat roll Y. Incidentally, FIGS. 2A and 2B to FIGS. 4A and 4B show that the superconducting stranded wires are moved in a direction shown by an arrow 9, namely, from the bottom to the top in the drawings. Therefore, the wires are pinched between the tapered rolls A and B as well as between the flat rolls X and Y so as to be roll-formed.

The present invention is described with reference to FIGS. 2A and 2B. When the roll-forming of the stranded wires is started, one side end of the stranded wires to be made smaller in thickness is pressed at first. The reason thereof resides in that since the rolls A and B are tapered, the corresponding surface portions of the tapered rolls A and B which are located closer to the side end portion of the stranded wires come into contact with the stranded wires, at first. Although the superconducting stranded wires to be roll-formed by the tapered rolls A and B reduces in thickness in such manner that the superconducting stranded wires extend in the width direction, the side x of the rolled stranded wires is arrested by the flat roll X. Thus, the superconducting stranded wires thus compressed and deformed push adjacent superconducting stranded wires, which are located opposite to the side x, in the direction toward the thicker side y. The stranded wires thus pushed are then pressed by the tapered rolls A and B to push further adjacent superconducting stranded wires in the direction toward the thicker side y. The pushing process described above is executed in sequence, resulting in that a portion having a less packing rate is formed at the side end portion of the superconducting compacted stranded wires, i.e., the thicker side y, eventually.

More specifically, the portion of the superconducting compacted stranded wires which has the highest packing rate and is placed under the severe fabrication conditions is press-formed at first, This permits adjacent superconducting stranded wires to be pushed in the direction toward the side y which has a lower packing rate, so that the above-mentioned severe fabrication conditions can be moderated.

In contrast, according to the conventional method as shown in FIGS. 5A and 5B, the pair of tapered rolls 5' and 6' each of which has a tapered surface portion corresponding to a specified keystone angle, as shown in FIG. 5A, as well as the pair of flat rolls 7' and 8' are used to pinch the stranded wires, so that the stranded wires are pressed from the four directions. More specifically, according to the conventional method, i.e., in cases that the diameters of the flat rolls X' and Y' are equal to each other, since the both sides of the stranded wires in the lateral direction come into contact with the flat rolls X' and Y' at the same time, the compressions from the right and left sides start simultaneously. Then, the horizontal compression force applied from the thicker side considerably deteriorates the effect of the above-mentioned moderation of the severe fabrication conditions in which the adjacent superconducting stranded wires are pushed in the direction toward the side y. Accordingly, each of the superconducting wires residing in the region of the highest packing rate (the side portion of the compacted stranded wires which has smaller thickness) is arrested within a closed space enclosed by the tapered rolls A', B', the flat roll X', and adjacent wires. Therefore, various problems are apt to occur. For example, an excessive compression causes breakage of superconducting filaments. In addition, since portions in the stranded wires are excessively extended in the axial direction of the wires, cross-sections thereof are locally reduced. Furthermore, burrs (i.e., overhangs produced at edge portions) are generated, since parts of the superconducting stranded wires escape into the portions in which the tapered roll A' or B' and the flat roll X' are contacted (i.e., edges of the compacted stranded wires).

Figure 2A:
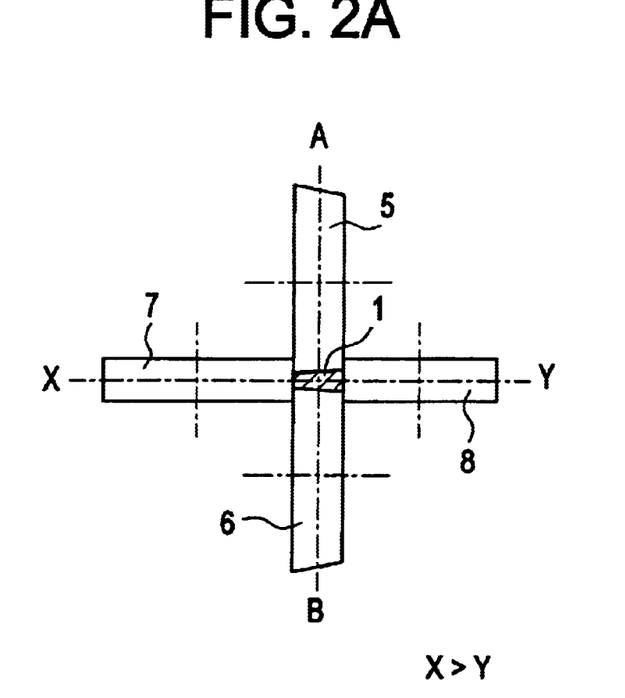
FIG. 2A is the front view of a group of rolls for roll-forming superconducting stranded wires according to one embodiment of the present invention.
Figure 2B:
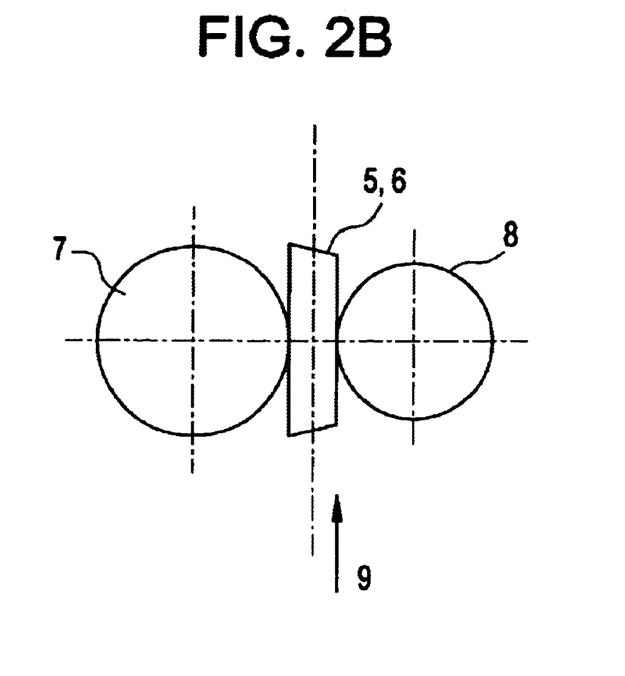
FIG. 2B is the plan view of the group of rolls for roll-forming superconducting stranded wires as shown in FIG. 2A.
Figure 3A:
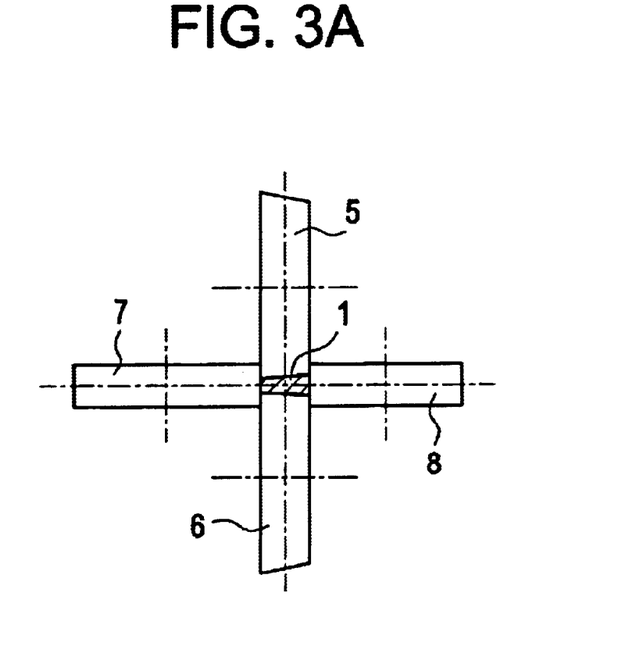
FIG. 3A is the front view of a group of rolls for roll-forming superconducting stranded wires according to other embodiment of the present invention.
Figure 3B:
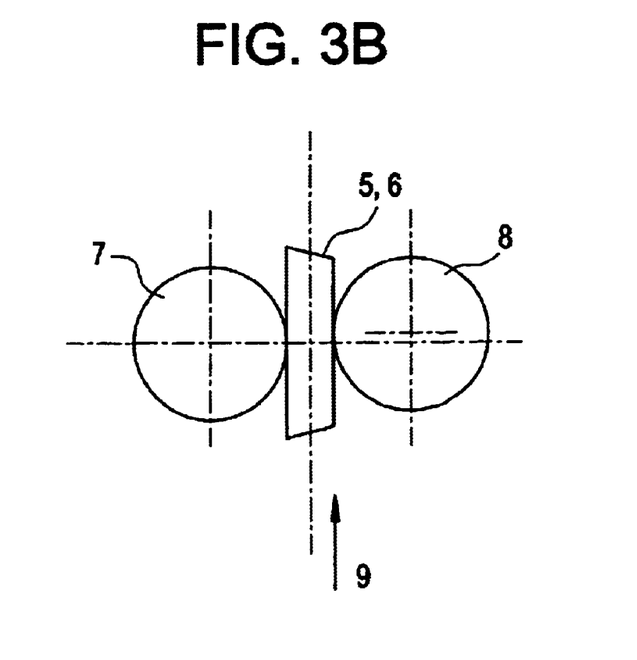
FIG. 3B is the plan view of the group of rolls for roll-forming superconducting stranded wires as shown in FIG. 3A.
Figure 4A:
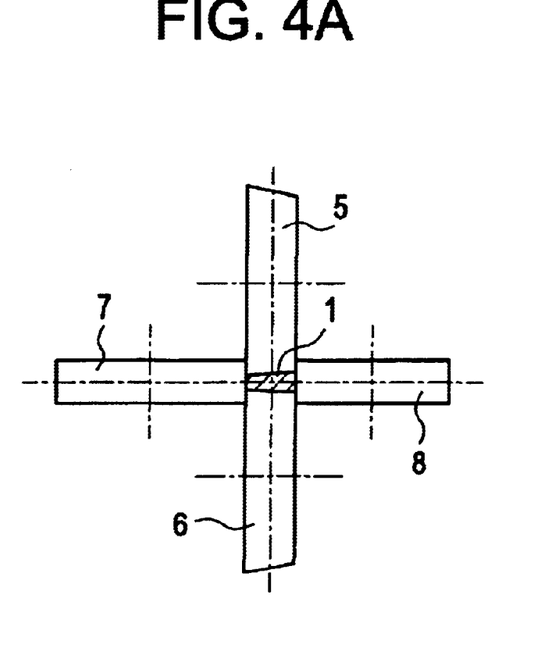
FIG. 4A is the front view of a group of rolls for roll-forming superconducting stranded wires according to other embodiment of the present invention.
Figure 4B:
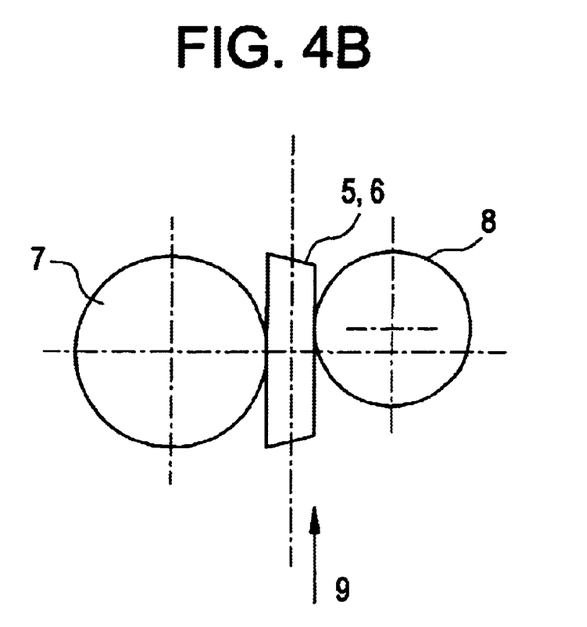
FIG. 4B is the plan view of the group of rolls for roll-forming superconducting stranded wires as shown in FIG. 4A.

On the other hand, in the present invention, i.e., in cases that the flat roll Y to come into contact with the side y of the compacted stranded wires is smaller in diameter than the flat roll X, as shown in FIGS. 2A and 2B, other side end of the stranded wires comes into contact with the flat roll Y later than the contact of one side end of the stranded wires with the flat roll X. More specifically, when the side x and its surrounding portion of the compacted stranded wires begins to be compressed from the tapered rolls A, B and the flat roll X, the side y of the stranded wires have not been compressed as yet, thus the superconducting wires are easily moved in the direction toward the side y by pushing. Accordingly, the severe fabrication conditions in the portion having the highest packing rate is moderated, thus the above-mentioned drawbacks are not occurred.

Furthermore, embodiments of the invention as shown in FIGS. 3A and 3B, and 4A and 4B provide other effective configurations for delaying the contact of the side y of the stranded wires with the flat roll Y. In both configurations, the position of axis of the flat roll Y is located backward compared to that of the flat roll X with regard to the moving direction of the stranded wires. An amount of the above-mentioned backward arrangement of the axis position of the flat roll Y (hereinafter referred to as an offset length) is directly related to a delay distance in the contact of the side y of the stranded wires with the flat roll Y. It is therefore possible to gain larger delay distances by means of the back arrangement of the axis position compared to the above-mentioned configuration as shown in FIGS. 2A and 2B in which the flat rolls X and Y differ in their diameters. However, in the case of changing the diameters of the flat rolls X and Y, the compressions from the flat rolls X and Y end at the same time, whereas in the case of the backward arrangement of the roll axis, the compression from the flat roll X ends during the compressive forming from the flat roll Y. Thus, it has to be considered that the employment of the excessive offset length of the central position of the roll Y may give unstable shapes to the compacted stranded wires, such as jetting of the stranded wires and fluctuations in the keystone angle.

As described above, according to the present invention, a method and an apparatus for manufacturing stable and reliable superconducting compacted stranded wires can be provided by means of improved fabrication conditions of the stranded wires.

EXAMPLES

The present invention will now be described in detail by examples.

Example 1

36-pieces of Cu/NbTi composite multifilamentary superconducting wires, each of which was 0.825 mm in diameter, 1.95 in area ratio of Cu/NbTi, 6,426 pieces in the number of filaments, and 6 $\mu$m in filament diameter, were stranded into a wedge-shaped mandrel, and then pressed with rolls to manufacture keystone type superconducting compacted stranded wires having thickness of 1.36 mm (thinner side) and 1.60 mm (thicker side), width of 15.0 mm, and keystone angle of 0.9 degrees.

Roll-forming was executed with the use of the tapered rolls A and B each of which is 136 mm in outer diameter and 0.5 degrees in tapered angle, as well as the flat roll X having an outer diameter of 136 mm, and the flat roll Y having an outer diameter of 125 mm.

All the rolls A, B, X and Y were disposed in such manner that all the axes thereof were on the same plane.

Example 2

A flat roll of which outer diameter is 115 mm was used as the flat roll Y, and the remaining fabrication conditions were set to be the same as those of the example 1. Thus, keystone type superconducting compacted stranded wires having the same circumscribed dimensions as those in the example 1 were manufactured.

Example 3

A flat roll of which outer diameter is 105 mm was used as the flat roll Y, and the remaining fabrication conditions were set to be the same as those of the example 1. Thus, keystone type superconducting compacted stranded wires having the same circumscribed dimensions as those in the example 1 were manufactured.

Example 4

A flat roll of which outer diameter is 136 mm, which is the same as that of the flat roll X, was adopted as the flat roll Y, and then the flat roll Y was disposed backward by 1 mm in axial position to the flat roll X with regard to the moving direction of the stranded wires, and the remaining fabrication conditions were set to be the same as those of the example 1. Thus, keystone type superconducting compacted stranded wires having the same circumscribed dimensions as those in the example 1 were manufactured.

Example 5

A flat roll of which outer diameter is 105 mm was adopted as the flat roll Y, and then the flat roll Y was disposed backward by 1 mm in axial position to the roll X with regard to the moving direction of the stranded wires, and the remaining fabrication conditions were set to be the same as those of the example 1. Thus, keystone type superconducting compacted stranded wires having the same circumscribed dimensions as those in the example 1 were manufactured.

Example for Comparison 1

A flat roll of which outer diameter is 136 mm, which is the same as that of the flat roll X, was adopted as the flat roll Y and the remaining fabrication conditions were set to be the same as those of the example 1. Thus, keystone type superconducting compacted stranded wires having the same circumscribed dimensions as those in the example 1 were manufactured.

Figure 6:
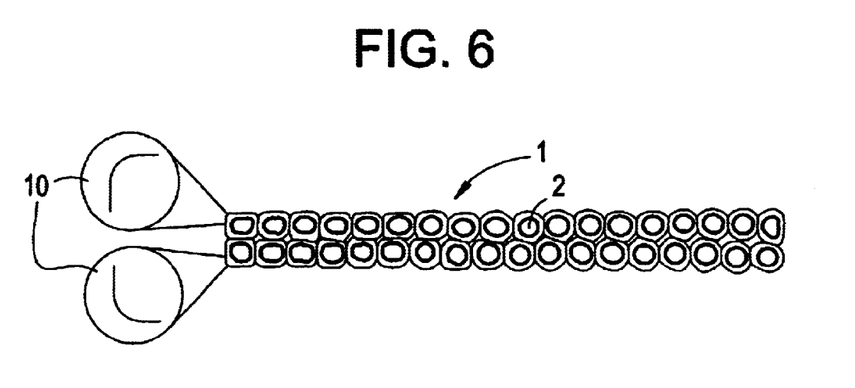
FIG. 6 shows a cross section of the keystone type superconducting compacted stranded wires according to embodiments of the present invention.

The thinner-side edge portion of each of the superconducting compacted stranded wires manufactured in the examples 1 to 5 and the example for comparison 1 were observed with the use of a microscope from the perpendicular directions thereto in order to measure respective transit lengths. The results are shown in Table 1. As shown in FIG. 6, the transit length is defined as the length of each portion 10 in the edges of the side end of the superconducting compacted stranded wires as depicted in the circle, of which curved surface is kept as it is without being contacted with any roll during the roll-forming of the stranded wires.

The compacted stranded wires manufactured in the examples 1 to 5 and the example for comparison 1 were un-stranded and the superconducting wire samples were picked up, and then, the superconducting wire samples were immersed in liquid helium to measure critical current based on the four-terminal method. The critical current measurements of the un-stranded wire samples were executed in such a manner that a portion located at the thinner-side end (i.e., curved portion) of each compacted stranded wire was set at a center between voltage taps.

Concurrently, superconducting wire samples were picked up from a portion which has not roll-formed as yet in the vicinity of each un-stranded wire sample, and then the superconducting wire samples were also immersed in liquid helium to measure critical current based on the four-terminal method. By comparing the critical currents with each other, reduced rates in the critical current when roll-forming the stranded wires were calculated. The results are shown in Table 2.

As is clear from Table 1, the transit portion (i.e., having transit length) exists in the edges of thinner-side end of the compacted stranded wires in the examples 1 to 3 in which the flat roll Y is smaller in diameter than the flat roll X, the example 4 in which the flat roll Y is located backward compared to the flat roll X, and the example 5 in which the flat roll Y is smaller in diameter than the flat roll X and in addition the flat roll Y is located backward compared to the flat roll X.

Meanwhile, in the example for comparison 1 in which the flat rolls X and Y are the same in diameter and all the axes of the rolls A, B, X and Y are arranged on the same plane, burrs 11 occurred at edges of compacted stranded wires as depicted in the circle in FIG. 7. This exhibits in the example for comparison 1 that there was no vacant place within the compacted stranded wires into which the superconducting wires residing in the region having the highest packing rate are to be moved by being pushed.

In addition, as is clear from Table 2, the reduced rates of critical current during roll-forming of the stranded wires in the examples 1 to 5 were about 1 percent, whereas the reduced rate in the example for comparison 1 was deteriorated down to about 8 percents. This deterioration is resulted from the fact that the superconducting wires residing in the region having the highest packing rate were arrested therein, so that they are forced to excessively extend in their longitudinal directions.

According to the present invention, there can be obtained the method and apparatus for manufacturing keystone type superconducting compacted stranded wires which has superior superconducting property and shapes.

Industrial Availability

No burr is produced in the edges of the thinner-side end in the superconducting compacted stranded wires when the diameters of the flat rolls are made to be different from each other, in case that a pair of tapered rolls and a pair of flat rolls for holding are used to roll-form the superconducting stranded wires, alternatively, when the float rolls are located at different positions in the back and forth direction with regard to the moving direction of the stranded wires. Those configurations enable a transit portion is produced in the edges of the side end of the superconducting compacted stranded wires, of which thickness is thinner than the other side, resulting in that there is no burr on the edge. In addition, the reduced rate of critical current during roll-forming the stranded wires is about 1 percent. Therefore, according to the method of the present invention for manufacturing the superconducting compacted stranded wires, keystone type superconducting compacted stranded wires can be obtained with superior superconducting properties and shapes. In consequence, a remarkable contribution can be given to industry.

TABLE 1

Transit length of each sample of the compacted stranded wires

| | Roll Y | | Transit length (mm) | | |
|---|---|---|---|---|---|
| | Outer diameter (mm) | Offset (mm) | Sample 1 | Sample 2 | Sample 3 |
| Example 1 | 125 | Non | 0.10 | 0.11 | 0.10 |
| Example 2 | 115 | Non | 0.14 | 0.14 | 0.15 |
| Example 3 | 105 | Non | 0.16 | 0.17 | 0.16 |
| Example 4 | 136 | 1 | 0.11 | 0.12 | 0.10 |
| Example 5 | 105 | 1 | 0.19 | 0.18 | 0.19 |
| Example for comparison 1 | 136 | Non | Non (burr occurred) | Non (burr occurred) | Non (burr occurred) |

TABLE 2

Reduced rate of critical current
(Measured at 6 tesla with samples immersed in liquid helium)

| | Roll Y | | Critical current (A) | | | | | | Reduced rate of critical current in stranded wire (%) |
|---|---|---|---|---|---|---|---|---|---|
| | | | Before formed into stranded wire | | | After formed into stranded wire | | | |
| | Outer diameter (mm) | Offset (mm) | Sample 1 | Sample 2 | Average A1 | Sample 1 | Sample 2 | Average A2 | |
| Example 1 | 125 | Non | 418 | 417 | 417.5 | 413 | 413 | 413 | 1.1 |
| Example 2 | 115 | Non | 417 | 418 | 417.5 | 412.5 | 412 | 412.3 | 1.2 |
| Example 3 | 105 | Non | 416 | 415 | 415.5 | 411 | 412 | 411.5 | 1.0 |
| Example 4 | 136 | 1 | 417 | 416.5 | 416.8 | 412 | 412 | 412 | 1.2 |
| Example 5 | 105 | 1 | 417 | 417 | 417 | 413 | 413.5 | 413.3 | 0.9 |
| Example for comparison 1 | 136 | Non | 416 | 416 | 416 | 382 | 383 | 382.5 | 8.1 |

* The reduced rate was calculated by "{(Average A1 − Average A2) / Average A1} × 100 [%]."

What is claimed is:

1. A method of manufacturing keystone type superconducting compacted stranded wires, the method comprising:
    roll-forming superconducting stranded wires into keystone type superconducting compacted stranded wires from four directions, said superconducting stranded wires have a first side end and a second side end, said first side end is thinner than said second side end after being roll-formed;
    wherein said roll-forming superconducting stranded wires includes:
        operating a group of rolls comprising a first tapered rolls and a second tapered roll, said tapered rolls having tapered outer surfaces and rotation axes that are parallel with each other and a first flat rolls and a second flat roll, said flat rolls having rotation axes that are parallel with each other and that are perpendicular to the rotation axes of said tapered rolls;
        contacting said first side end of said superconducting stranded wires with said first flat roll before said second side end is contacted with said second flat roll;
        compressing and deforming the first side end of the superconducting stranded wires by said tapered rolls and said first flat roll; and
        pushing adjacent wires in a direction toward said second side end.

2. The manufacturing method as claimed in claim 1, wherein a diameter of said first flat roll contacts with said first side end of the superconducting stranded wires, said diameter of said first flat roll is larger than a diameter of said second flat roll.

3. The manufacturing method as claimed in claim 1 or 2, wherein said second flat roll contacts with said second side end of the superconducting stranded wires, said second flat roll is located backward compared to said first flat roll in relation to a direction in which the superconducting stranded wires are moved.

4. An apparatus for manufacturing keystone type superconducting compacted stranded wires, the apparatus comprising:
    a group of forming rolls that roll-form superconducting stranded wires from four directions, said group of forming rolls comprising a first tapered roll and a second tapered roll, said tapered rolls having rotation axes that are parallel with each other;
    a first flat roll and a second flat roll, said flat rolls having rotation axes that are parallel with each other and are orthogonal to the rotation axes of the tapered rolls;
    a diameter of said first flat roll is larger than a diameter of said second flat roll; and
    means for compressing and deforming the superconducting stranded wires by said tapered rolls and said first flat roll so that a first side end pushes adjacent wires in a direction toward a second side end and said first side end is thinner than said second side end.

5. An apparatus for manufacturing keystone type superconducting compacted stranded wires, the apparatus comprising:
    a group of forming rolls that roll-form superconducting stranded wires from four directions, said group of forming rolls comprising a first tapered roll and a second tapered roll, said tapered rolls having rotation axes are parallel with each other;
    a first flat rolls and a second flat roll, said flat rolls having rotation axes are parallel with each other and are orthogonal to the rotation axes of the tapered rolls, said first flat roll contacts with first side end of the superconducting stranded wires, said second flat roll is located backward compared to that of said first flat roll in relation to a direction in which the superconducting stranded wires are moved; and means for compressing and deforming the superconducting stranded wires by said tapered rolls and said first flat roll so that a first side end pushes adjacent wires in a direction toward a second side end and said first side end is thinner than said second side end.

6. The method of claim 1, further comprising pressing said first side end with said first flat roll and pressing said second side end with said second flat roll.

7. An apparatus for manufacturing keystone type superconducting compacted stranded wires, the apparatus comprising:

a group of forming rolls comprising a first tapered roll and a second tapered roll, said tapered roll having rotation axes that are parallel with each other;

a first flat roll and a second flat roll, said flat rolls having rotation fixes that are parallel with each other and are orthogonal to the rotation axes of the tapered rolls; and means for compressing and deforming the superconducting stranded wires by said tapered rolls and said first flat roll so that a first side end pushes adjacent wires in a direction toward a second side end and said first side end is thinner than said second side end.

8. The apparatus of claim 7, wherein said mean for compressing and deforming includes contacting a first flat roll with a first side end of said superconduding stranded wires before a second flat roll is contacted with a second side end.

9. The apparatus of claim 8, wherein a diameter of said first flat roll is larger than a diameter of said second flat roll.

10. The apparatus of claim 8, wherein said second flat roll is located backward compared to said first flat roll in relation to a direction in which the superconducting stranded wires are moved.

11. A method of manufacturing keystone type superconducting compacted stranded wires, the method comprising:

roll-forming superconducting stranded wires into keystone type superconducting compacted stranded wires from four directions, said superconducting stranded wires have a first side end and a second side end, said first side end is thinner than said second side end after being roll-formed;

wherein said roll-forming superconducting stranded wires includes:

operating a group of rolls comprising a first tapered roll and a second tapered roll, said tapered rolls having tapered outer surfaces and rotation axes that axle parallel with each other and a first flat roll and a second flat roll, said flat rolls having rotation axes that are parallel with each other and that are perpendicular to the rotation axes of said tapered rolls; and compressing and deforming the superconducting stranded wires by said tapered rolls and said first flat roll so that said first side end pushes adjacent wires in a direction toward said second side end.

* * * * *